United States Patent
Westbrook

(10) Patent No.: US 6,865,320 B1
(45) Date of Patent: Mar. 8, 2005

(54) OPTICAL TAPS FORMED USING FIBER GRATINGS

(75) Inventor: Paul Westbrook, Chatham, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 44 days.

(21) Appl. No.: 10/373,613

(22) Filed: Feb. 25, 2003

Related U.S. Application Data

(60) Provisional application No. 60/364,875, filed on Mar. 15, 2002.

(51) Int. Cl.[7] .................................................. G02B 6/34
(52) U.S. Cl. ......................................... 385/37; 356/364
(58) Field of Search ...................... 385/11, 37; 356/364, 356/367

(56) References Cited

U.S. PATENT DOCUMENTS

| | | | |
|---|---|---|---|
| 5,061,032 A | | 10/1991 | Meltz et al. |
| 5,832,156 A | | 11/1998 | Strasser et al. |
| 5,982,962 A | * | 11/1999 | Koops et al. .................. 385/37 |
| 6,069,985 A | * | 5/2000 | Albin et al. ................... 385/12 |
| 6,198,557 B1 | * | 3/2001 | Dultz et al. .................. 398/102 |
| 6,211,957 B1 | * | 4/2001 | Erdogan et al. ............. 356/364 |

* cited by examiner

Primary Examiner—Juliana K. Kang

(57) ABSTRACT

A matched pair of tilted gratings may be formed in a section of optical fiber (or waveguide) and used as a "tap" to measure the power of an optical signal passing through the fiber. By using a pair of highly-tilted gratings (e.g., tilted at an angle of 45° with respect to the optical axis) and orienting the gratings to be orthogonal with respect to one another (i.e., azimuthal orthogonality around the fiber axis), a pair of orthogonally polarized beams will be out-coupled from the propagating signal. Since the pair of beams are orthogonal, their sum can be made insensitive to variations in polarization of the optical signal propagating along the fiber.

10 Claims, 3 Drawing Sheets

SIDE VIEW

END VIEW

OPTICAL TAPS FORMED USING FIBER GRATINGS

CROSS-REFERENCE TO RELATED APPLICATION

This application claims the benefit of U.S. Provisional Application No. 60/364,875, filed Mar. 15, 2002.

TECHNICAL FIELD

The present invention relates to an optical tap and, more particularly, to a fiber-based tap formed by using a matched pair of fiber gratings.

BACKGROUND OF THE INVENTION

There are already known various constructions of optical waveguides, including optical fibers, that are provided with embedded gratings which are used for removing light at various locations along the extent of the waveguide (i.e., an "optical tap"). In particular, it is possible to convert a guided mode wave in an optical fiber into a leaky mode exiting the waveguide by forming a grating of appropriate periodicity in at least the core region of the waveguide or fiber, thus directing the radiation out of the optical axis. In many optical systems, an optical tap is useful in capturing and monitoring the signal passing through the optical waveguide. U.S. Pat. No. 5,061,032, issued to G. Meltz et al. on Oct. 29, 1991, discloses a particular optical tap arrangement that utilizes a blazed, chirped refractive index grating selected to redirect light guided in the fiber such that it comes to a focus at a point outside of the fiber. The patent also discloses that the angle of the external path that results in the constructive interference is peculiar to the respective central wavelength ($\lambda$).

The tap of the Meltz et al. patent exhibits shortcomings in terms of, for example, the relatively large (e.g., greater than 22°) blaze angle that is required to achieve the desired redirection of the light guided in the fiber core to light in space outside of the fiber, the arrangement is subject to undesirable polarization effects, i.e., the fraction of light that is redirected by the grating depends on the polarization of the incident guided light. Whereas for low blaze angles (<10°) the polarization-dependent difference in the amount of redirected light is at most about 0.54 dB, this difference increases rapidly with increasing blaze angle, being about 2.86 dB and about 6.02 dB for blaze angles of 22° and 33°, respectively.

One prior art attempt to overcome the polarization-dependent problems associated with large blaze angles is disclosed in U.S. Pat. No. 5,832,156 issued to T. A. Strasser et al. on Nov. 3, 1998. In the Strasser et al. optical tap, the grating is selected such that guided mode light of a predetermined wavelength will be directed into one or more cladding modes of the waveguide. The tap also includes coupling means that are in optical co-operation with the waveguide such that the cladding mode is a radiation mode. The presence of the coupling means changes the waveguide properties in the vicinity of the grating such that the grating directs the light into a radiation mode (or modes). This is typically accomplished by elimination of some or all of the cladding modes in the region of the index grating by some appropriate type of physical means.

However, polarization-dependent problems remain with the Strasser et al. tap, as well as other optical tap arrangements, where the ability to out-couple a portion of a propagating optical signal often depends upon (and changes as a result of) the polarization of the propagating signal.

SUMMARY OF THE INVENTION

The need remaining in the prior art is addressed by the present invention, which relates to an optical tap and, more particularly, to a fiber-based tap formed by using a matched pair of fiber gratings.

In accordance with the present invention, an optical tap comprises a pair of grating structures, disposed in a contiguous relation along the core region of an optical waveguide (e.g., fiber). The gratings exhibit a relatively large blaze angle (e.g., approximately 45°), where polarization-dependent problems are overcome by disposing the pair of gratings in an orthogonal orientation such that the out-coupled signals will be orthogonal to one another (i.e., the scattering angle is orthogonal to the fiber axis). The pair of signals are then directed into a pair of optical detectors, where the output signals are then added together to form a power monitoring output signal. By using a pair of orthogonal out-coupled signals, any polarization-dependent variations in the propagating optical signal are essentially eliminated.

The polarization insensitive optical tap of the present invention is particularly well-suited for use with various other fiber-based devices, such as an in-line all-fiber polarimeter. An optical tap of the present invention disposed at the exit of such a polarimeter can be used to measure the power of the output signal from the polarimeter and modify its performance accordingly.

Various other uses and embodiments of the present invention will become apparent during the course of the following discussion and by reference to the accompanying drawings.

BRIEF DESCRIPTION OF THE DRAWINGS

Referring now to the drawings.

DETAILED DESCRIPTION

When the period of a fiber grating is adjusted so as to couple core guided light into light propagating approximately orthogonally through the fiber (that is, through the cladding so as to exit along the side of the fiber), the tilted grating will scatter the light in a highly polarization sensitive and highly directional manner. Importantly, the scattering is extremely broadband, since the orthogonally scattered light has a very small interaction length with the grating along the core region. Therefore, a single, orthogonally-coupled grating of the present invention functions to scatter light out of the core mode into radiation modes over a large bandwidth and in a very directional manner, allowing for ease of coupling into a detector placed near the fiber surface. The period A of the grating is controlled to define the wavelength range over which the orthogonal out-coupling will occur. The scattering efficiency of such gratings of the present invention will exhibit a bandwidth on the order of 50 nm over which the scattering efficiency will remain essentially constant, with a typical angular spread of approximately 20° for the scattered beam. Such a tilted grating thus performs the following two functions: (1) since one polarization mode is predominantly coupled out of the fiber, the grating functions as a highly polarization sensitive tap that can be used to detect polarization state within the fiber; and (2) the light transmitted through the grating experiences polarization dependent loss (PDL), again because the grating scatters only one polarization out of the fiber.

Figure 1:
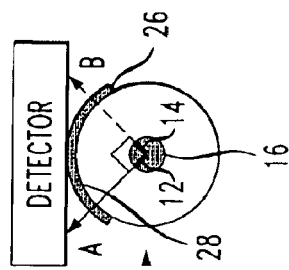
FIG. 1 illustrates an exemplary polarization-insensitive optical tap formed in accordance with the present invention.
Figure 2:
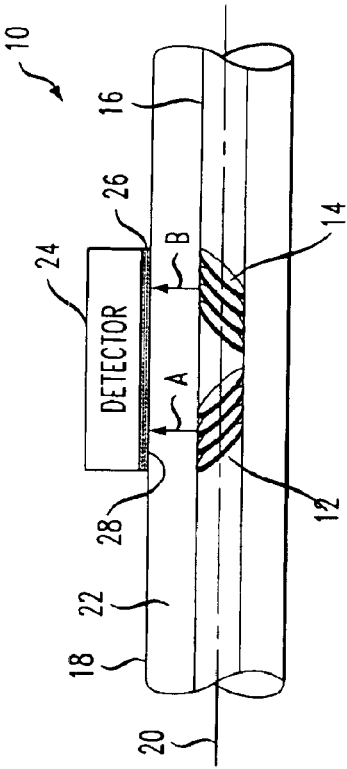
FIG. 2 is an end view of the arrangement of FIG. 1, particularly illustrating the orthogonal orientation of the pair of highly-tilted gratings.

The presence of polarization sensitivity in the tilted fiber grating can therefore be used to make broadband polarization insensitive taps if two such gratings are inscribed in the fiber. The taps should be matched in all respects, except that they should be oriented in orthogonal directions with respect to each other such that they scatter orthogonal polarizations of the light propagating in the fiber core. FIG. 1 illustrates an exemplary polarization insensitive tap 10 which includes a first tilted grating 12 and a second tilted grating 14 formed in a core region 16 of an optical fiber 18. In this particular embodiment of the present invention, each grating exhibits a "tilt angle" (also referred to in the art as a "blaze angle") on the order of 45° with respect to fiber axis 20 (i.e., is "highly tilted"). Moreover, gratings 12 and 14 are inscribed in core region 16 with their respective orientations rotated by 90° with respect to one another, resulting in forming the necessary orthogonal coupling (see FIG. 2). In its most general case, the tilt angle can be modified from the "highly tilted" value of 45°, as long as the gratings remain as a "matched" orthogonal pair (in fact, gratings with a continuously varying azimuthal angle and grating strength may be used). FIG. 2, an end view of polarization tap 10 of FIG. 1, clearly illustrates the orthogonal orientation between first grating 12 and second grating 14. With reference to FIG. 2, the azimuthal angle separating gratings 12 and 14 about the fiber axis is maintained at 90° to achieve polarization insensitivity. It is to be understood that although gratings in FIGS. 1 and 2 are shown as formed in different parts of the fiber, the gratings may also be inscribed directly on top of each other in the same section of fiber. Further, it is to be noted that the polarization-dependent loss of the tap in transmission will be reduced to zero in the "matched" orthogonal condition, since equal amounts of each polarization are scattered out of the fiber.

Referring back to FIG. 1, the out-coupled radiation A from first grating 12 and the out-coupled radiation B from second grating 14 pass through cladding layer 22 of fiber 18 and are coupled into an optical detector 24 located next to (or on) fiber 18. Indeed, beams A and B from gratings 12 and 14, respectively, are coupled into a single detector 24. A conventional pair of PIN devices can be used in detector 24 to capture the pair of beams A and B, converting the captured optical signals into electrical representations. In accordance with the teachings of the present invention, as long as tap gratings 12 and 14 are matched in strength, the light detected by detector 24 will be insensitive to the polarization of the light incident on the grating structure. Although gratings 12 and 14 appear next to each other in FIG. 1, they may also be overlapping spatially within core region 16. In one embodiment, such a structure may be formed in a highly birefringent fiber, with the gratings aligned with one axis of the fiber. Typical grating length for an arrangement as illustrated in FIG. 1 is approximately 1 mm, this allowing for a few percent (e.g., less than 10%) of the optical signal to be out-coupled by the grating.

An improvement to the optical tap of the present invention can be made by adding an index-matching material on the outside of the fiber. FIGS. 1 and 2 illustrate the inclusions of such an index matching layer 26 (for example, commercially available epoxy that is index-matched to the silica fiber) on at least a portion of the outer surface 28 of optical fiber 18 (in a preferred embodiment, the epoxy is disposed everywhere between the fiber surface and the detector). A fiber grating formed in bare fiber typically exhibits resonances in its transmission spectrum, due to resonances resulting from reflections at the air-fiber interface. These resonant structures result in imparting a wavelength-dependence to the light out-coupled by the tap. By adding an index-mating material, such wavelength dependence is greatly reduced.

Figure 3:
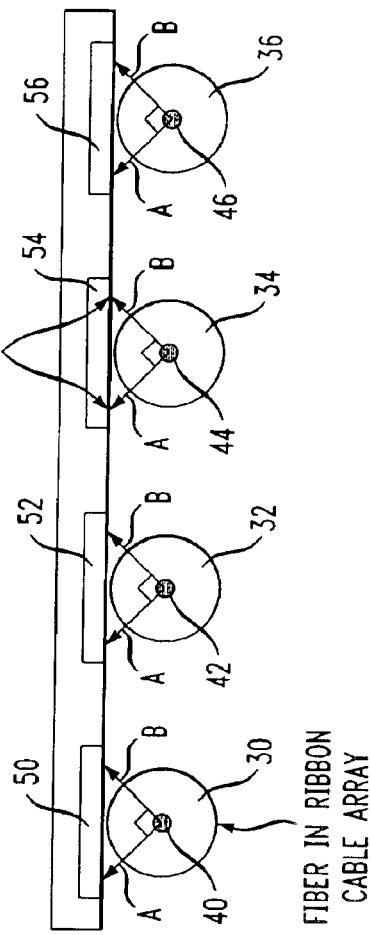
FIG. 3 illustrates an embodiment of the present invention for use with an array of separate optical fibers.
Figure 4:
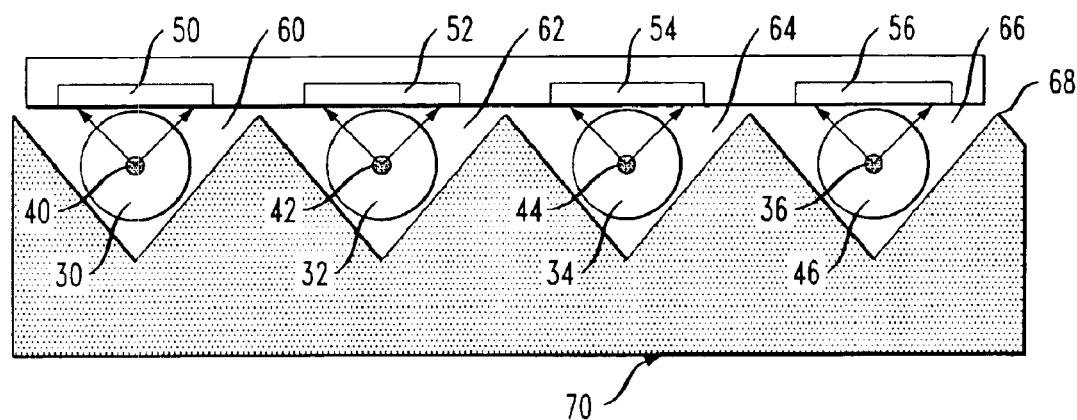
FIG. 4 contains a diagram of an alternative array arrangement, with the separate fibers disposed in V-grooves in a substrate so as to prevent the light out-coupled from one fiber to interfere with the signal exiting any other fiber.

The use of a matched pair of tilted gratings as polarization insensitive optical taps is especially applicable in fiber array arrangements, where space is at a premium. FIG. 3 illustrates a portion of an exemplary array embodiment of the present invention, showing (in an end view) four separate fibers 30, 32, 34 and 36, each including a pair of highly tilted, matched gratings to form a polarization insensitive optical tap, as illustrated in FIGS. 1 and 2, above. That is, fiber 30 includes a pair of gratings (not shown) written in core region 40 to generate a pair of out-coupled, orthogonal beams A and B, the pair of beams applied as an input to a detector 50. Similarly, fiber 32 includes a pair of gratings formed in core region 42 to tap out a pair of orthogonal beams A and B that are directed into detector 52, and so on, for fibers 34 and 36. In order to prevent "cross talk" between fibers 30–36, some means of preventing one light signal from entering an adjacent detector is needed. FIG. 4 illustrates one embodiment wherein fibers 30, 32, 34, and 36 are disposed in associated V-grooves 60, 62, 64 and 66 formed in a top surface 68 of a supporting substrate 70. Accordingly, the V-grooves are formed deep enough to block essentially all light out-coupled by one tap (such as from core 40) from entering the detector (such as detector 52) associated with another tap (such as from core 42).

Figure 5:
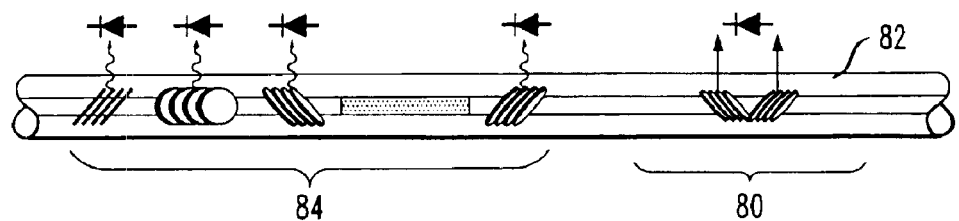
FIG. 5 illustrates the use of a polarization-insensitive tap of the present invention with an in-line all-fiber polarimeter, the tap used to measure the output power from the polarimeter.
Figure 6:
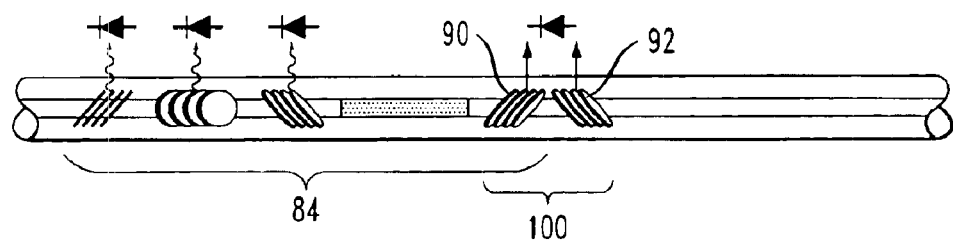
FIG. 6 contains an alternative embodiment of the combination of a polarimeter and an optical tap, where the final grating in the polarimeter is used as one of the gratings in the optical tap.

FIG. 5 illustrates an embodiment of the invention where a polarization insensitive tap 80 is formed in the same section of optical fiber 82 as an in-line, all-fiber polarimeter 84. As is discussed in U.S. Pat. No. 6,211,957, an in-line, all-fiber polarimeter comprises a plurality of separate gratings and an associated waveplate to completely determine the associated Stokes parameters and completely define the state of polarization (SOP) of an optical signal passing therethrough. A polarization insensitive tap 80 of the present invention, disposed at the output of polarimeter 84 can then be used to measure the power associated with the optical signal. FIG. 6 illustrates an alternative embodiment of this arrangement, where a final grating 90 of polarimeter 84 is utilized as a first grating of a polarization insensitive optical tap 100 of the present invention. A second grating (also tilted) is then oriented to be orthogonally coupled (i.e., "matched") with final grating 90 so as to form a "hybrid" in-line all-fiber polarimeter and polarization insensitive optical tap, in accordance with the present invention. The polarization insensitive tap may also be combined with one or two gratings that measure only a portion of the polarization information contained in the optical signal.

In accordance with the present invention, the taps may be formed in birefringent fiber, and disposed so as to align with the axes of birefringence. In this case, the taps function to measure the amount of light in each of the two polarization modes of the birefringent fiber.

Figure 7:
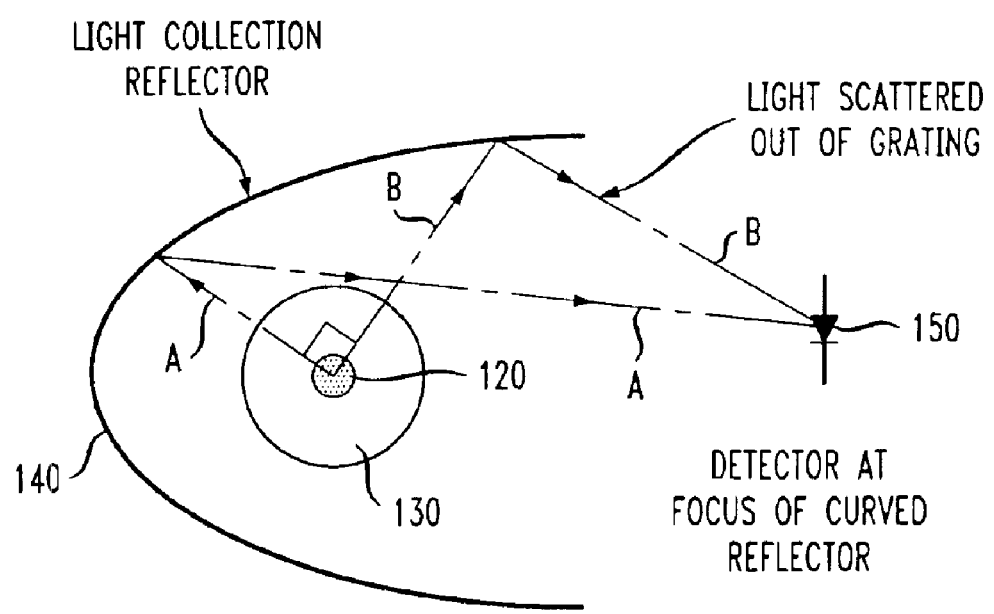
FIG. 7 illustrates an optical tap of the present invention and an associated shaped reflector used to redirect the out-coupled light from the pair of fiber gratings.

Coupling optics of various types may be used to direct the light from the grating to the detectors. FIG. 7 illustrates a particular embodiment of the present invention where the out-coupled beams A and B from a pair of orthogonal gratings 120 (shown in an end view in this particular drawing) within an optical fiber 130 are directed toward a light collection reflector 140 positioned alongside of fiber 130. In this arrangement reflector 140 comprises an elliptically-shaped mirror surface (although other geometries, such as parabolic, may be used), with the optical axis of gratings 120 positioned at a first focal point $F_1$ of elliptical reflector 140. An associated detector 150 may therefore be positioned at the second focal point $F_2$ of reflector 140, where beams A and B will be redirected by reflector 140 so as to focus onto detector 150.

In the case where the gratings are not completely matched, they will provide information on the state of polarization of the light. Such a measurement can be included with the information from the polarimeter to improve the polarimeter accuracy. In addition, the fiber may be terminated with a separate detector (as opposed to an in-line device) that measures the total power transmitted through the grating. This detector power may be combined with the information from the grating taps, as well as the polarimeter, to provide polarization information about the optical signal.

While the present invention has been illustrated and described as embodied in particular constructions, it will be appreciated that the present invention is not so limited. For example, a polarization-insensitive optical tap of the present invention may be formed in a substrate-based optical waveguide instead of an optical fiber, as discussed above. Other arrangements, including hybrid arrangements of fibers and waveguides, are possible as well. Thus, the scope of protection of the present invention is to be determined solely from the claims appended hereto.

What is claimed is:

1. A polarization insensitive optical tap formed in a section of optical waveguide including a core region for supporting the propagation of an optical signal, said polarization-insensitive optical tap comprising:
    a first highly-tilted grating disposed along a predetermined portion of the core region of the section of optical waveguide, said first highly-tilted grating oriented to out-couple a first optical signal from a propagating optical signal at a predetermined angle with respect to the optical axis of the optical waveguide;
    a second highly-tilted grating disposed in association with said first highly-tilted grating along said predetermined portion of said core region of said section of optical waveguide, said second grating tilted at essentially the same angle as said first highly-tilted grating and oriented to out-couple a second optical signal from said propagating optical signal at an angle orthogonal to said predetermined angle, said second optical signal exhibiting a polarization state orthogonal to the polarization state of the first optical signal; and
    an optical detector disposed outside of the section of optical waveguide at a location to capture the first and second optical signals from the first and second highly-tilted gratings, said optical detector for summing the pair of output signals to remove polarization dependence and provide an optical monitoring signal output.

2. A polarization-insensitive tap as defined in claim 1 wherein the tap further comprising an index-matching material disposed between the section of optical waveguide and the detector to improve the coupling efficiency into the optical detector.

3. A polarization-insensitive optical tap as defined in claim 1 wherein the tap further comprises lenses disposed between the section of optical waveguide and the optical detector for improving the coupling efficiency into said optical detector.

4. A polarization-insensitive optical tap as defined in claim 1 wherein the tap further comprises mirrors disposed between the section of optical waveguide and the optical detector for improving the coupling efficiency into said optical detector.

5. A polarization-insensitive optical tap as defined in claim 1 wherein the tap further comprises a combination of lenses and mirrors disposed between the section of optical waveguide and the optical detector for improving the coupling efficiency into said optical detector.

6. A polarization-insensitive optical tap as defined in claim 1 wherein the optical waveguide comprises an optical fiber and the first and second highly-tilted gratings comprise a pair of gratings formed in a core region of the optical fiber.

7. A polarization-insensitive optical tap as defined in claim 6 wherein the optical fiber comprises a birefringent optical fiber and the pair of gratings are aligned with the two axes of birefringence.

8. A polarization-insensitive optical tap as defined in claim 1 wherein each grating is tilted at an angle of approximately 45° with respect to the optical axis of the optical waveguide.

9. An optical arrangement comprising
    an all-fiber in-line polarimeter comprising
        a plurality of separate gratings and an optical waveguide disposed along a section of optical fiber, each grating oriented at a separate, predetermined angle with respect to the optical axis and functioning to out-couple light from an optical signal propagating along said section of optical fiber; and
        a plurality of optical signal detectors disposed alongside the section of optical fiber and positioned so as to capture out-coupled light from the plurality of separate gratings, the outputs from the plurality of optical signal detectors used to define the state of polarization of the optical signal propagating along said section of optical fiber; and
    a polarization insensitive optical tap disposed at the output of the all-fiber in-line polarimeter to measure the output power of the propagating optical signal, the polarization insensitive optical tap comprising
        a first highly-tilted grating disposed along a predetermined portion of the core region of said section of optical fiber, said first highly-tilted grating oriented to out-couple a first optical signal from a propagating optical signal at a predetermined angle with respect to the optical axis of the optical fiber;
        a second highly-tilted grating disposed in association with said first highly-tilted grating along said predetermined portion of said core region of said section of optical fiber, said second grating tilted at essentially the same angle as said first highly-tilted grating and oriented to out-couple a second optical signal from said propagating optical signal at an angle orthogonal to said predetermined angle, said second optical signal exhibiting a polarization state orthogonal to the polarization state fo the first optical signal.

10. An optical arrangement as defined in claim 9 wherein the first highly-tilted grating of the polarization insensitive optical tap is also used as the final grating in the plurality of gratings of the all-fiber in-line polarimeter.

* * * * *